Jan. 8, 1957  J. G. EDELEN, SR  2,776,442
BED RAIL AND POST CONNECTIONS
Filed Nov. 1, 1952
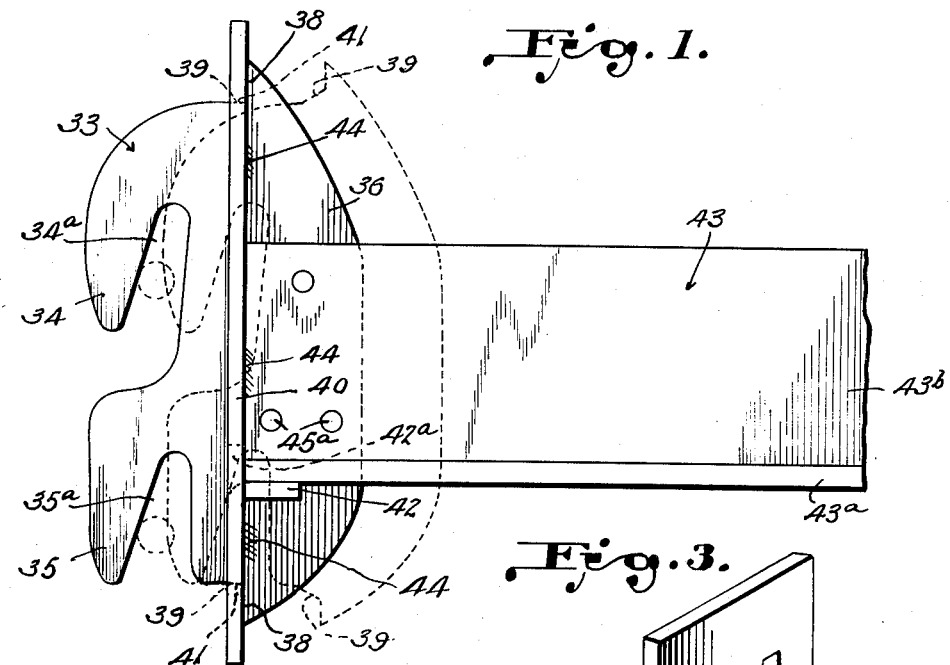
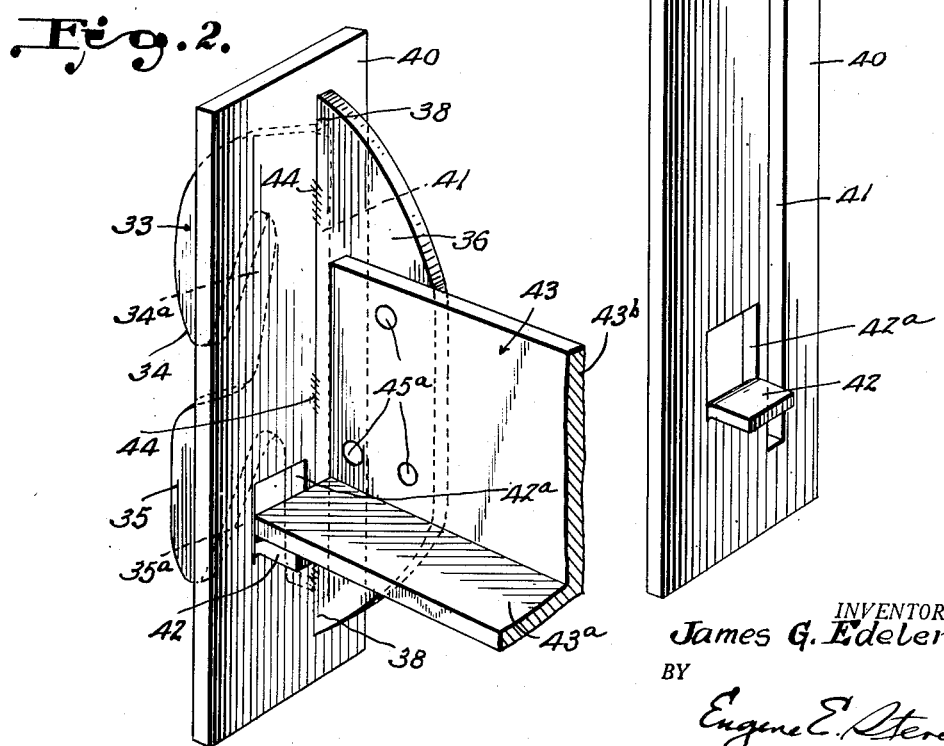
INVENTOR.
James G. Edelen, Sr.
BY
Eugene E. Stevens
ATTORNEY.

United States Patent Office 2,776,442
Patented Jan. 8, 1957

2,776,442
BED RAIL AND POST CONNECTIONS

James Gough Edelen, Sr., Baltimore, Md.

Application November 1, 1952, Serial No. 318,297

3 Claims. (Cl. 5—296)

My invention relates to improvements in connectors such as are shown in my Patent No. 2,602,939, dated July 15, 1952, and which are especially suited for connecting bed rails and posts, although adapted for use in connecting elements of knock-down furniture or the like generally, and also for other purposes.

Briefly and generally stated, the present invention aims to provide a device for the purpose specified which is simple in construction, strong and durable, easy to use, and which may be manufactured in quantity at relatively low cost.

Additionally, the invention contemplates a connector for bed rails and posts, and for other purposes, which is formed of two simple stampings which can be readily assembled and which provide a bearing plate or member having portions which extend to opposite sides of a hook member which the device provides.

Various other objects and advantages of the invention will be readily understood and appreciated by those skilled in the art upon reference to the accompanying drawing in connection with the following detailed description of the illustrated examples of the invention.

In the drawings, wherein the same reference characters have been used to designate the same parts throughout the several views—

Fig. 1 is a side elevational view of the connector device of the invention;

Fig. 2 is a perspective view of same; and

Fig. 3 is a perspective view of the backing plate of Figs. 1 and 2.

Referring to the drawings by reference characters an example of the invention is shown in Figs. 1, 2 and 3 wherein the hook-providing plate 33 differs from the corresponding plate 13 of Figs. 1-4, inclusive, of my copending divisional application Serial Number 218,297, primarily in that the top and bottom notches 18, 19 are eliminated. Instead of notches the hook plate 33 of Figs. 1 and 2 of the instant invention has top and bottom cutouts providing shoulders 38 to bear against the rear surface of the bearing plate 40 which corresponds to the bearing plate 20 of my aforementioned application.

Referring specifically to Figs. 1, 2 and 3, the hook plate 33 provides the upper and lower hook members 34, 35, respectively, which provide the pin-receiving recesses or slots 34a, 35a.

The rear portion 36 of the hook plate 33 terminates in the forwardly disposed top and bottom shoulders 38 which bear against the rear surface of the bearing plate 40 beyond the ends of the slot 41 which extends longitudinally of said bearing plate 40.

The hook portions 34, 35 of the hook plate 33 adjacent the shoulders 38 have the longitudinal triangular form stock extensions 39 which extend beyond the ends of slot 41 and are adapted to be fused or welded to the bearing plate 40 at the site of opposite ends of bearing plate slot 41 during assembly of the plates 33, 40. Any remaining residue of such fused stock 39 will be cleared away after the plates 33, 40 have been assembled as indicated in Fig. 1. However, welding of 33 to 40 is not necessary when the rail end abuts plate 40, as shown, and particularly when the lug 42 (to be described) is used.

It should also be noted that when it is deemed desirable to rigidly secure plates 33, 40 together means other than welding may be employed; and further, that in lieu of, or in addition to, employment of the fusible extensions 39 the plates may be welded together as at 44 in Figs. 1 and 2.

Projecting from the rear face of the bearing plate 40 is the lug 42 which is adapted to supportingly engage the bottom surface of the horizontal flange 43a of the angular bed rail 43 as shown in Figs. 1 and 2, said rail 43 having the vertical flange 43b. Of course, said lug 42 is adapted to support other than angle form bed rails.

The rearwardly projecting portion 36 of the hook plate is spot welded or riveted as indicated at 45a to the outer surface of the vertical flange 43b of the bed rail 43. By employing the lug 42 any tendency of the bearing plate 40 to creep upwardly in service is prevented especially when it is not fused or welded as at 39 or 44 to the hook plate 33. Lug 42 may be formed by striking it out from the stock of bearing plate 40 as indicated.

In point of fact, one of the aims of the present invention is to provide a rail and post connection, or the equivalent, which can be conveniently shipped in knockdown form from the factory and readily assembled by the furniture retailer without the necessity for welding the bearing plate 40 to the hook plate 33. There are on the market rivets which can be readily applied, as at 45a, by the retailer for securing the rear end 36 of the hook plate 33 to the vertical flange 43b of the rail 43 after the hook plate 33 and bearing plate 40 have been assembled as indicated in Figs. 1 and 2. However, when the terminal members 33, 40 are assembled at the factory, they will preferably be welded together employing the fuse weld 39 of Fig. 1 or the welds 44 of Figs. 1 and 2.

Although the invention has been illustrated in connection with an angle form metal bed rail, it is to be understood that the terminal member comprising the hook plate and the bearing plate may be applied to different forms of bed rails whether made of metal or wood; and further, that the connecting terminal is applicable to "knock-down" furniture generally for connecting parts thereof.

It is to be noted from Fig. 2 that a nail or screw may be projected partially through plate hole 42a immediately above the bottom rail flange 43a and into the wooden bed post (not shown) to hold the rail 43 seated on lug 42.

Also, when a wooden rail is used in lieu of the metal rail 43 of Figs. 1 and 2, a nail or screw may be projected from the bedpost (not shown) through the hole 42a in plate 40 and into said wooden rail end for the same purpose. In such latter instance, the lug 42 can be dispensed with entirely, if desired.

Having thus described my invention, what I claim is:

1. A rail and post connector for knock-down furniture comprising a hook-providing plate having a forward hook portion and a rear portion adapted to be connected to a rail, top and bottom perpendicularly extending shoulders provided by said rear portion at its junction with said hook portion and extending above the top and bottom edges of the latter, the inner ends of the shoulders terminating in fusible portions, a bearing plate having a closed longitudinally extending slot therein through which the hook portion of said hook plate is projected, the fusible hook plate portions fused to the bearing plate, the hook plate shoulders bearing against the bearing plate beyond the ends of said bearing plate slot whereby said hook plate is retained in a fixed position relative to said bearing plate, said bearing plate having a rearwardly and horizontally extending rail supporting lug struck from said bearing plate leaving a fastener-receiving opening through which a stop element can be engaged in the post, and said rail supporting lug maintaining said bearing plate against upward vertical movement.

2. The combination set forth in claim 1, and wherein the length of said bearing plate slot approximates the distance between the top and bottom of said hook plate at the site of said shoulders, and wherein said fusible portions are fused to the bearing plate at the site of the slot ends.

3. A rail and post connector for knockdown furniture comprising a hook providing plate having a forward hook portion and a rear portion adapted to be connected to a rail, top and bottom perpendicularly extending shoulders provided by said rear portion at its junction with said hook portion and extending above the top and bottom edges of the latter, the inner ends of said shoulders terminating in forwardly extending fusible portions, a bearing plate having a closed longitudinally extending slot therein of a length approximating the distance from the top to the bottom of said hook portion and through which slot the latter is projected, the fusible hook plate portions being fused to the bearing plate adjacent its slot ends, and the hook plate shoulders bearing against the bearing plate beyond the ends of the bearing plate slot whereby said hook plate is retained in a fixed position relative to said bearing plate.

References Cited in the file of this patent

UNITED STATES PATENTS

| | | |
|---|---|---|
| 1,274,802 | Spiegel | Aug. 6, 1918 |
| 1,288,544 | Farrow | Dec. 24, 1918 |
| 2,160,174 | Scalera | May 30, 1939 |
| 2,602,939 | Edelen | July 15, 1952 |
| 2,648,074 | Jonas | Aug. 11, 1953 |